US012686263B2

(12) United States Patent
Woodson et al.

(10) Patent No.: US 12,686,263 B2
(45) Date of Patent: Jul. 21, 2026

(54) ON-BOARD DIAGNOSTIC MECHANISM FOR ACTIVE GRILLE SHUTTER SYSTEM

(71) Applicant: Magna Exteriors Inc., Aurora (CA)

(72) Inventors: Paul N. Woodson, Detroit, MI (US); Jeffrey B. Manhire, Rochester, MI (US)

(73) Assignee: Magna Exteriors Inc., Aurora (CA)

( * ) Notice: Subject to any disclaimer, the term of this patent is extended or adjusted under 35 U.S.C. 154(b) by 301 days.

(21) Appl. No.: 18/637,633

(22) Filed: Apr. 17, 2024

(65) Prior Publication Data

US 2024/0351428 A1 Oct. 24, 2024

Related U.S. Application Data

(60) Provisional application No. 63/496,743, filed on Apr. 18, 2023.

(51) Int. Cl.
B60K 11/08 (2006.01)
B60K 11/06 (2006.01)

(52) U.S. Cl.
CPC ............ B60K 11/085 (2013.01); B60K 11/06 (2013.01)

(58) Field of Classification Search
CPC .............................. B60K 11/06; B60K 11/085
See application file for complete search history.

(56) References Cited

U.S. PATENT DOCUMENTS

| | | | | |
|---|---|---|---|---|
| 8,646,552 B2 * | 2/2014 | Evans | ..................... | B60R 19/12 |
| | | | | 180/68.1 |
| 9,031,748 B2 * | 5/2015 | Sakai | ................... | B60K 11/085 |
| | | | | 701/49 |
| 10,946,823 B2 * | 3/2021 | Manhire | ................. | B60R 19/52 |
| 2010/0071977 A1 * | 3/2010 | Ritz | ..................... | B60K 11/085 |
| | | | | 180/68.1 |
| 2017/0106741 A1 * | 4/2017 | Shaw | ...................... | B60R 19/52 |
| 2017/0225560 A1 * | 8/2017 | Klop | ...................... | G05D 3/125 |
| 2018/0304843 A1 * | 10/2018 | Vacca | ..................... | B60R 19/52 |
| 2020/0148147 A1 * | 5/2020 | Totsuka | ................. | B60R 19/18 |
| 2020/0223306 A1 * | 7/2020 | Gerber | ................. | B60K 11/085 |
| 2020/0346538 A1 * | 11/2020 | Lindberg | ............ | F24F 13/1426 |
| 2024/0351428 A1 * | 10/2024 | Woodson | .............. | B60K 11/06 |

FOREIGN PATENT DOCUMENTS

| | | | | | |
|---|---|---|---|---|---|
| WO | WO-2019152520 A1 * | 8/2019 | ........... | B60K 11/085 |
| WO | WO-2023064327 A1 * | 4/2023 | ........... | B60K 11/085 |

* cited by examiner

*Primary Examiner* — Jacob B Meyer

(57) ABSTRACT

An active grill shutter assembly incorporating at least one locking mechanism in the case where a vane component is missing to improve the ability of an actuator to sense damage within the active aerodynamic system. This functionality may be achieved by including these features within the frame as an integral component, or it may be added as a separate component.

20 Claims, 6 Drawing Sheets

ON-BOARD DIAGNOSTIC MECHANISM FOR ACTIVE GRILLE SHUTTER SYSTEM

CROSS-REFERENCE TO RELATED APPLICATIONS

This application is a Non-Provisional patent application, which claims the benefit of U.S. Provisional Patent Application No. 63/496,743, filed Apr. 18, 2023. The disclosure of the above application is incorporated herein by reference.

FIELD OF THE INVENTION

The present invention relates to a diagnostic system adapted for diagnostic fault reading within active aerodynamic systems and a method regarding same.

BACKGROUND OF THE INVENTION

Increasing aerodynamic efficiency of vehicles will require better monitoring of active grille shutters and other aerodynamic aids which are designed to improve fuel efficiency in internal combustion engine vehicles and improve range in electric vehicles.

To help guarantee that aerodynamic aids such as active grille shutters are functioning properly, better methods of diagnosing faults are required.

SUMMARY OF THE INVENTION

The present invention is directed to an active grill shutter assembly, including a modified frame design to include at least one detent feature, e.g., spring feature, in cooperation with at least one respective vane, which detent feature remains out of the way of the vane motion if everything, e.g., the vanes, is properly in place but will operably cause the system to bind when any of the vanes are missing.

The present invention provides the capability to operably sense whether all of the vanes are present, which assists in ensuring that the grille shutter will provide the best possible aerodynamic benefit. If any of the vanes is missing, an actuator will operably sense this as an operational fault, and operably alert the operator of the concern.

The present invention also provides an improved diagnostic system for an active grille shutter assembly which offers the ability to operably lock the system in the safe "open" position if an error is found within the mechanism.

According to preferred aspects of the present invention, there is provided an integral spring for diagnostic reading within an active griller shutter system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
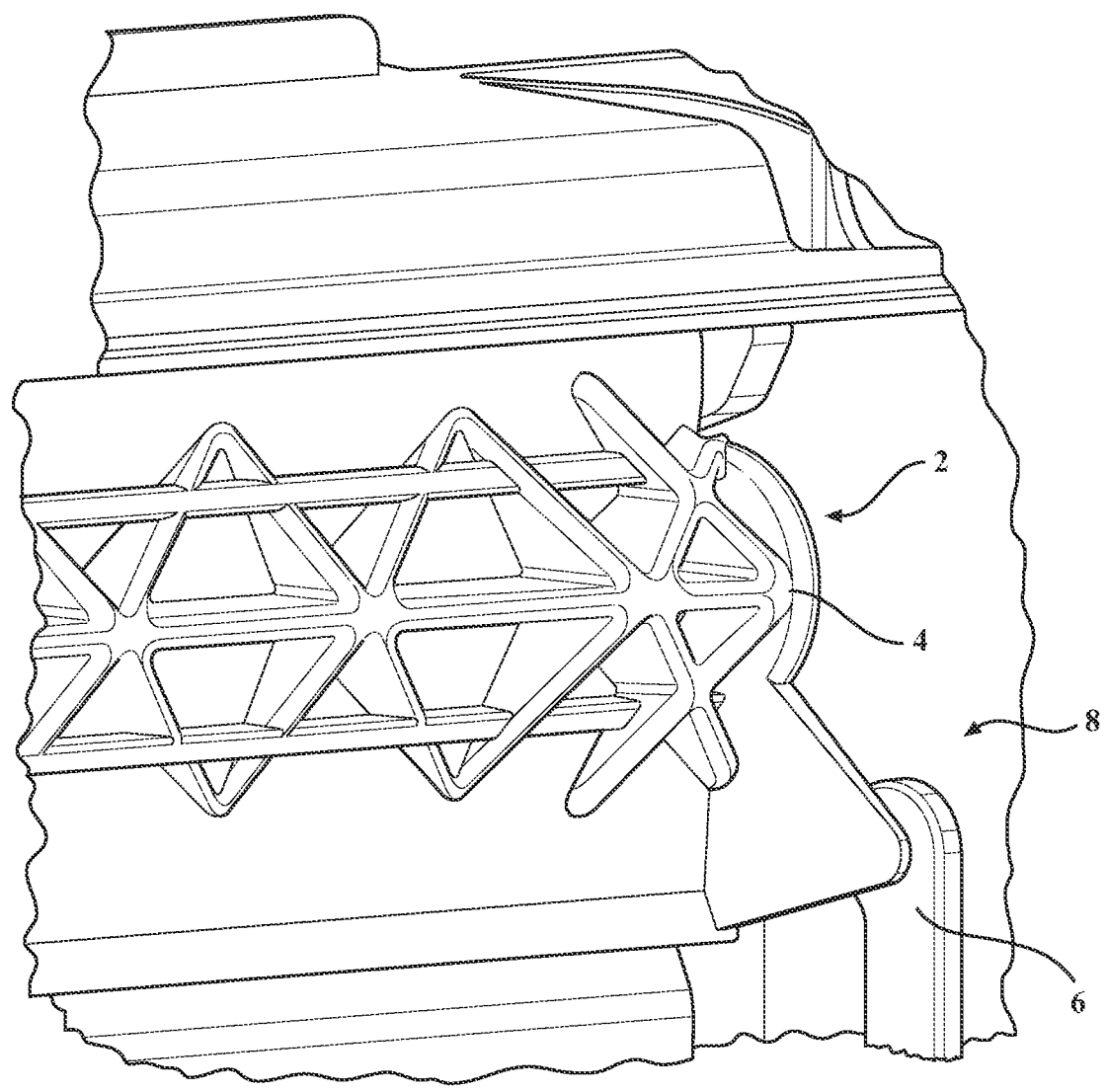
FIG. 1 is a perspective view of a prior art active grill shutter assembly.

FIG. 1 is a typical active grill shutter assembly 2. Vane 4 and link bar 6 rotate around a vane pivot. The link bar locates against a frame wall 8.

Referring to the FIGS. 2-10 generally, in accordance with the present invention, there is provided a frame design that includes a plurality of spring features which remain out of the way of the vanes' motion if everything is properly in predetermined place, but will operably cause the system to bind when any of the vanes are missing.

Adding a spring-like component to the active grille shutter (or referred to herein as "AGS") assembly to function as a locking mechanism in the case where a vane component is missing greatly improves the ability of the actuator to sense damage within the system. This functionality may be achieved by including these features within the frame as an integral component, or it may be added as a separate component.

In normal operation, the vane pushes against the spring features, which keeps these features away from the linkage; if any of the vanes are missing, the spring will move outboard, creating a jamming condition to the linkage. This jamming condition will not allow the vanes to rotate, which will cause the actuator to sense there is an error present and alert the control unit that there is a concern with the function of the assembly. These features are designed to jam or lock the mechanism at a partially-open position, which will guarantee air flow for cooling purposes, to avoid overheating of the vehicle's systems.

Figure 2:
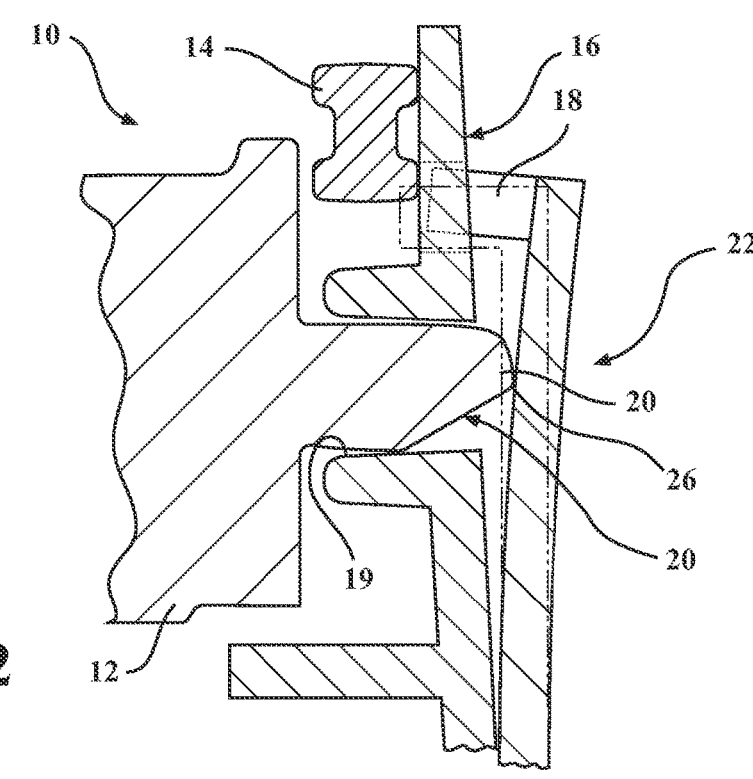
FIG. 2 is a side elevation of an active grill shutter assembly (also referred to herein as "AGS") assembly, according to aspects of the present invention.

Referring more particularly to FIG. 2, FIG. 2 generally depicts the AGS assembly, in accordance with aspects of the present invention. The AGS assembly, indicated generally at 10, is depicted, including at least one vane 12, at least one link 14, e.g., link bar, linkage, and at least one frame, indicated generally at 16. According to aspects of the present invention, there is provided at least one tab 18 preferably, a plurality of tabs 18, that is/are operably kept away from interference to the link 14 by being operably deflected when a respective vane 12 is present. At least one vane pivot, indicated generally at 20, is operably rotatably mounted through an aperture 19, and is operably adapted to press against and deflect at least one spring-like feature, indicated generally at 22, e.g., a springboard and/or additional component, in the frame 16, which keeps the at least one tab 18 out of interference with the link 14. If a vane 12 is missing, however, the spring-like feature 22, and therefore the tab 18, returns to as-molded position (indicated in phantom in FIG. 2) and directly interferes with link 14 motion. It is understood that the spring feature 22 may have any shape suitable for causing a jamming or locking condition of the link 14 when a vane 12 is missing so that the remaining vanes 12 cannot rotate.

Figure 3:
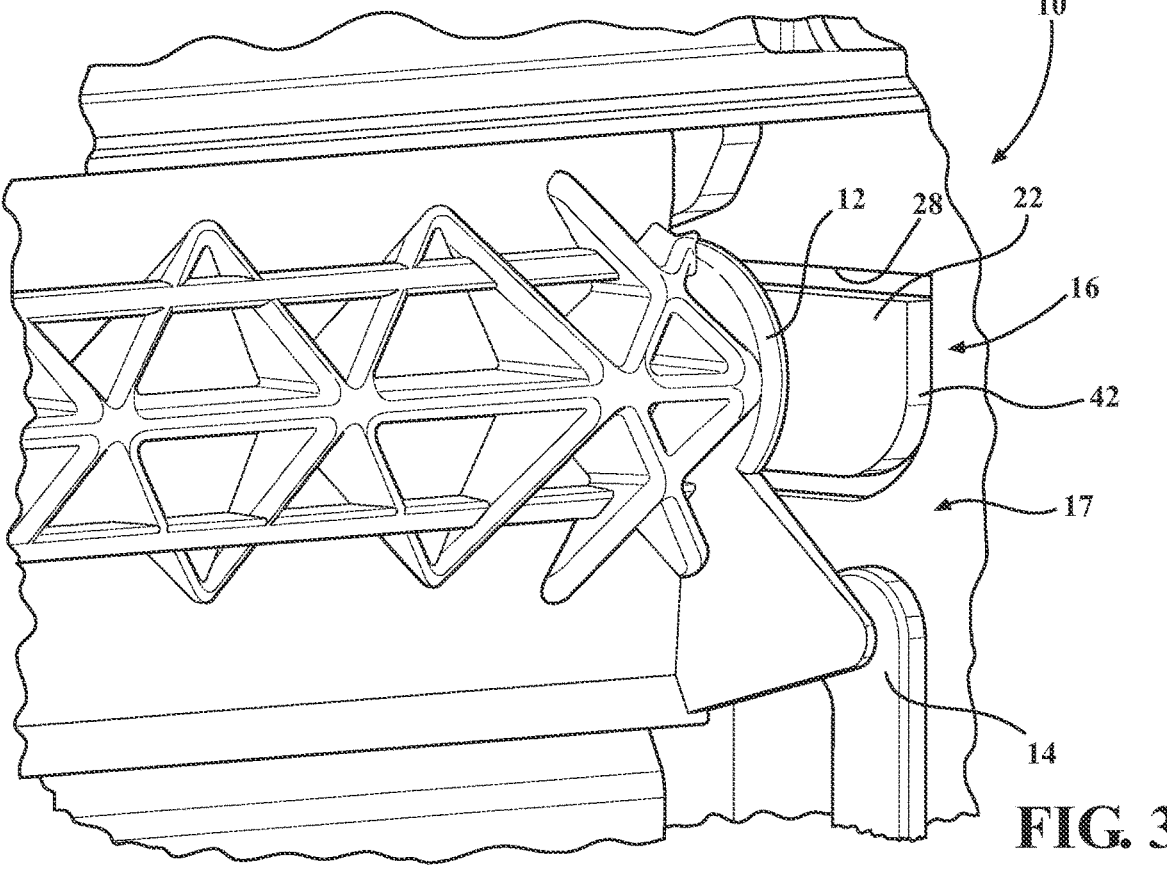
FIG. 3 is a perspective view of an AGS assembly, in accordance with the present invention.
Figure 4:
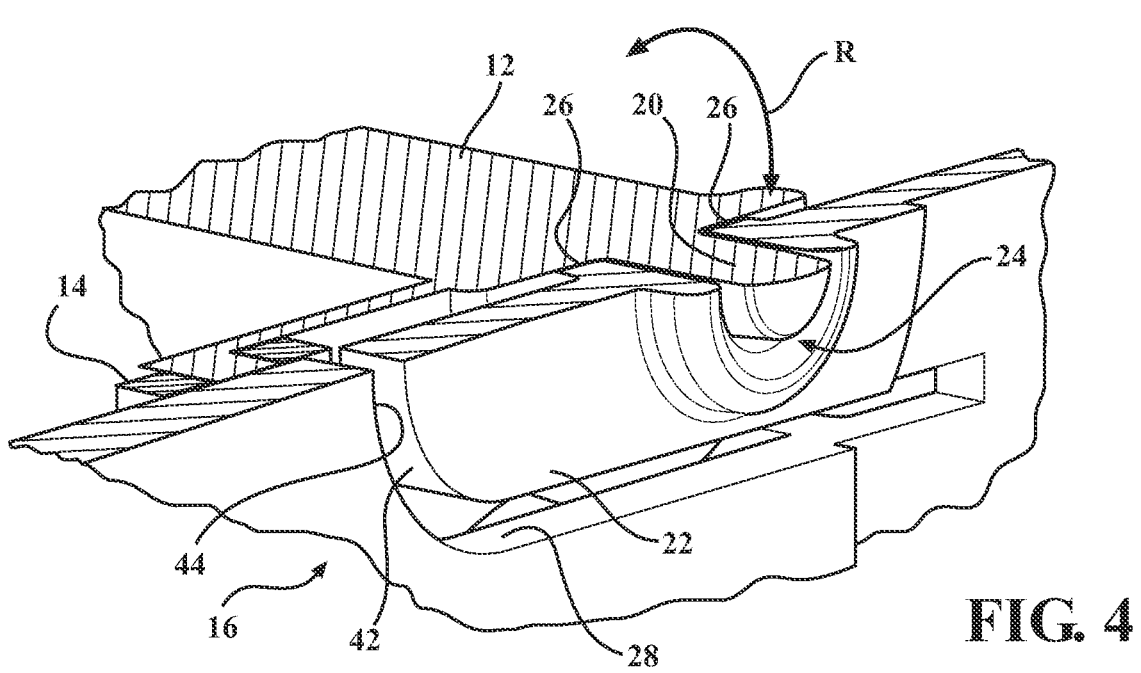
FIG. 4 is a perspective cross-sectional view of the AGS assembly under exemplary normal operation, according to aspects of the present invention.
Figure 5:
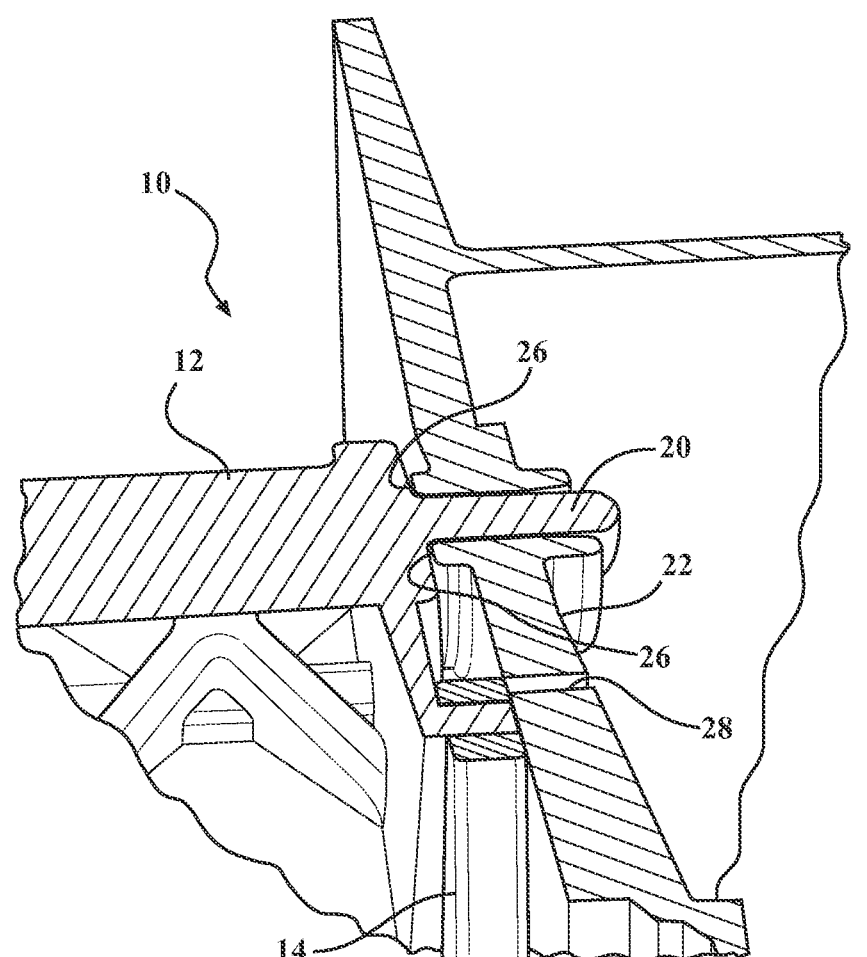
FIG. 5 is a perspective cross-sectional view of the AGS assembly under exemplary normal operation, according to aspects of the present invention.
Figures 6, 7:
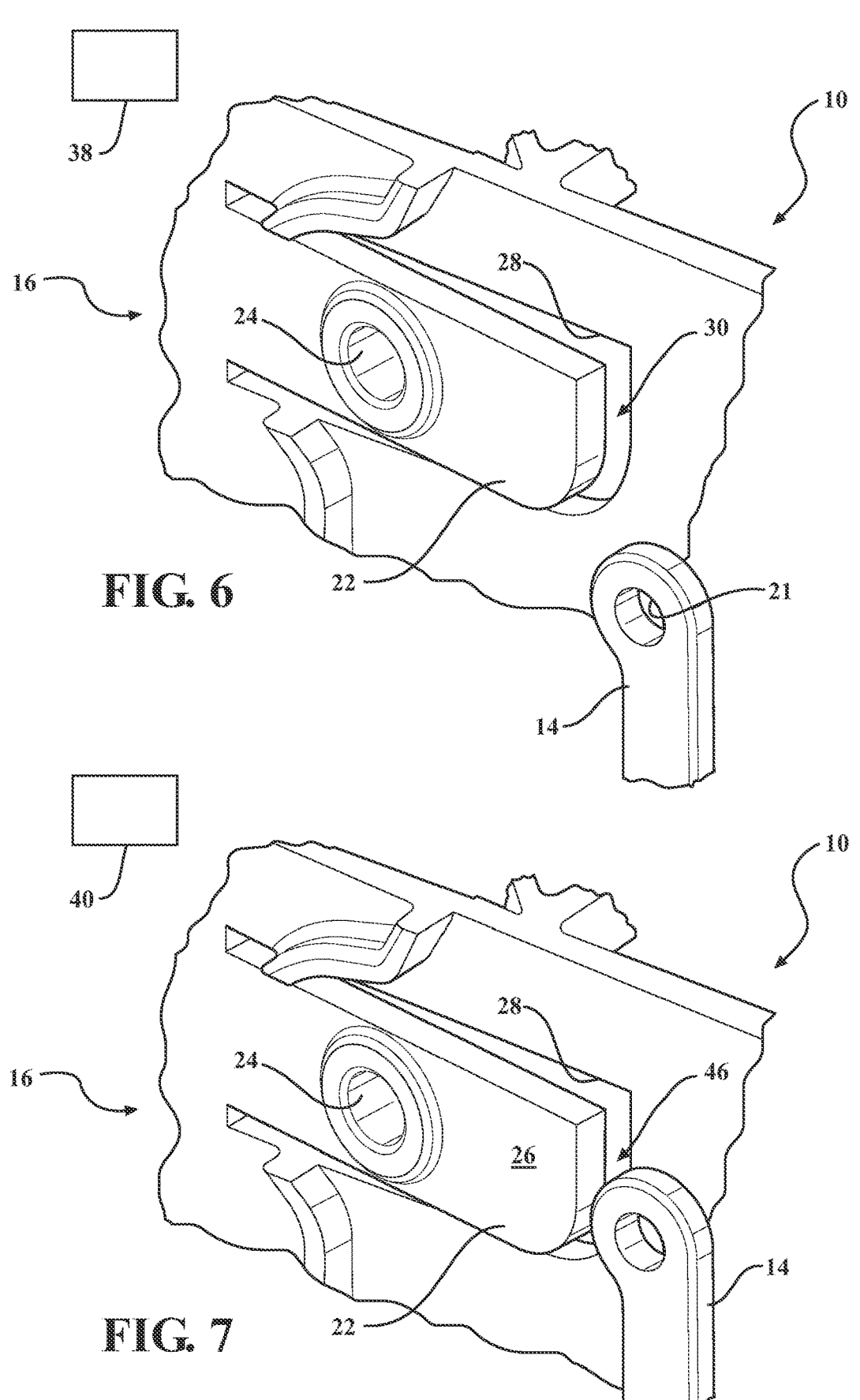
FIG. 6 is a perspective view of the AGS assembly under operation with a missing vane, according to aspects of the present invention.
FIG. 7 is a perspective view of the AGS assembly under operation with the vane missing, according to aspects of the present invention.

Referring more particularly to FIGS. 3-10, there is depicted the AGS assembly 10 in accordance with aspects of the present invention. The at least one vane 12 is rotatable by at least one vane pivot 20 at both ends of the vane 12. The link 14, e.g., link bar, linkage, is operably coupled to at least the vane 12, preferably via an opening 21 in the link 14, e.g., with at least one fastener, form-fit connection, etc. The link 14 substantially locates against the frame 16 wall, indicated generally at 17. The spring-like feature 22, e.g., springboard, is clear of interference to the link 14 when pressed by the vane 12 adjacent pivot joint 20. The spring feature 22 is operably moved between at least a first position (e.g., substantially closed position or non-interference position), and a second position (e.g., substantially open position or interference, jamming, or locking position). FIGS. 3-5 are an exemplary first position. FIGS. 6-7 are an exemplary second position.

The spring-like feature 22, e.g., springboard, is integrally formed with the frame 16 or is an additional component. By way of non-limiting example, an integrally formed spring-like feature 22 is a springboard with a base formed from the frame 16 and has a body that can fit within an opening 28 formed in the frame 16 such that an end 42 of the springboard 22 can generally stay within the opening 28 of the frame 16 out of interference with the link 14 when pressed by a vane 12, and can move freely to a second position when the springboard 22 is not pressed by the vane 12. By way of non-limiting example, the free end 42 of the springboard 22 is substantially aligned to the adjacent wall 44 of the frame 16 opening 28 when a vane 12 is not missing (e.g., see FIGS. 4-5). By way of non-limiting example, the free end 42 of the springboard 22 automatically moves outward from the opening 28 a predetermined distance from the frame wall 17 when a vane 12 is missing (e.g., see FIGS. 6-7), creating a fault condition indicated generally at 30, e.g., a predetermined lateral gap between the springboard 22 and frame wall or otherwise out of substantial alignment with the frame opening 28 wall 44.

Under exemplary normal operation, the spring features 22 are kept in position by the vanes 12, which push against at least one contact or bearing surface 26 of the spring features 22 to keep the spring features 22 away from the link 14. When the vane 12 functions normally, it rotates a predetermined amount (e.g., about 90° to selectively open and close). Rotation of the vane 12 a predetermined amount in a first direction opens the vane 12 (e.g., indicated at 'R' arrow in FIG. 4), while rotation of the vane 12 in a second direction closes the vane 12 (e.g., indicated at 'R' arrow in FIG. 4). Preferably, each vane 12 is provided in the respective apertures 24,24 of the frame 16 at both ends of the vane 12, 12 operable for allowing rotation of the vane 12.

According to aspects of the present invention, the aperture 24 is provided in the spring-like feature 22. Preferably, the aperture 24 is a hole in which the vane pivot 20 is rotatably mounted. While an exemplary contact surface interface is shown at 26, it is understood that more or less and alternative locations are contemplated without departure from the scope of the present invention.

When a missing vane 12 is missing or otherwise not rotatably mounted at the pivot joint 20, a fault condition exists. FIG. 6 depicts an exemplary closed position of the link 14 with the vane 12 missing. The free end 42 of the springboard 22 has rotated outward a predetermined amount from the frame 16 body. FIG. 7 depicts an exemplary partially open position of the link 14 and the vane 12 missing. The springboard 22 is still away from the frame body the predetermined amount. The missing vane 12 condition causes the springboard 22 to be positioned to interfere with movement of the link 14, e.g., at about at least 45 degrees open, or near farthest rearward position of the link 14, creating a jamming condition to the link 14 and not allow the vane components to rotate further. An exemplary interference condition is indicated at 46 (e.g., link 14 pivot end comes into contact with the free end 42 of the rotated springboard 22 since the springboard 22 is not being pressed by a vane 12). A preferred requirement is that the system 10 operably stops an actuator 38 driving the vanes 12 before its predetermined calibration range.

Generally, the open degree range, e.g., of the vanes 12, can be about 15 to 85 degrees, typically, about at least 25 to 75 degrees, preferably about at least 35 to 60 degrees, more preferably, about 40 to 55 degrees, most preferably about 45 degrees.

In normal operation, the vanes 12 push against the spring-like features, e.g., springboard 22, which keeps the spring-like features 22 away from the link 14, e.g., link bar. However, if any of the vanes 12 are missing, the spring-like feature 22, will move generally outboard, creating a jamming condition to the link 14. This jamming condition will not allow the vanes 12 to rotate, which will cause the operably coupled predetermined actuator 38 to operably sense, with at least one sensor operably integrated therewith, there is an error present and alert an operably coupled control unit, indicated at 40, that there is a concern with the function of the assembly 10. By way of non-limiting example, a current spike is operably sensed indicating a jamming condition. These features are designed to jam or lock the mechanism at a vanes partially-open position (e.g., exemplary depicted in FIG. 7), which will allow flow for cooling purposes to avoid overheating of predetermined vehicle's systems.

Figures 8, 9:
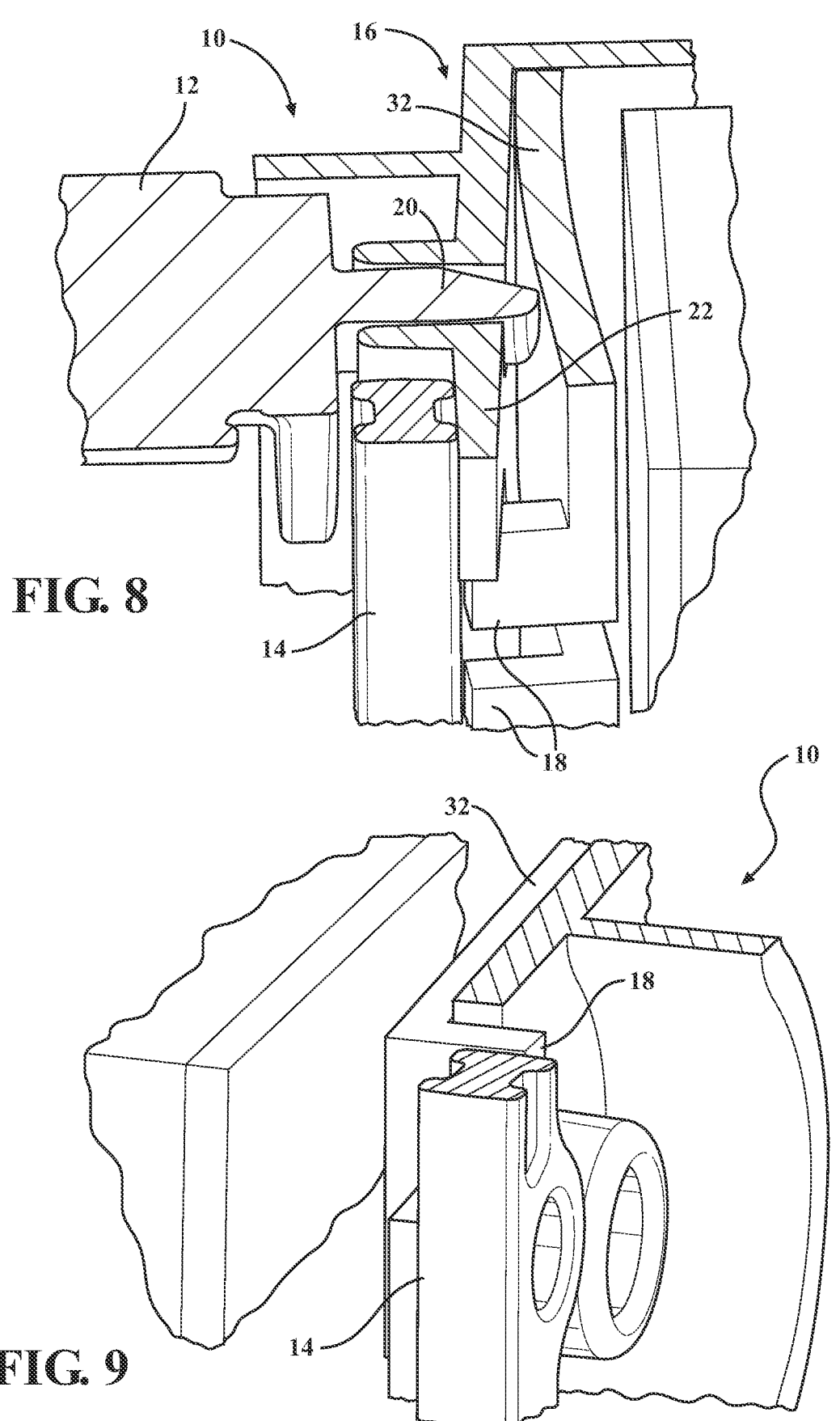
FIG. 8 is a perspective cross-sectional view of the AGS assembly under exemplary normal operation, according to aspects of the present invention.
FIG. 9 is a perspective cross-sectional view of the AGS assembly under abnormal operation, according to aspects of the present invention.
Figure 10:
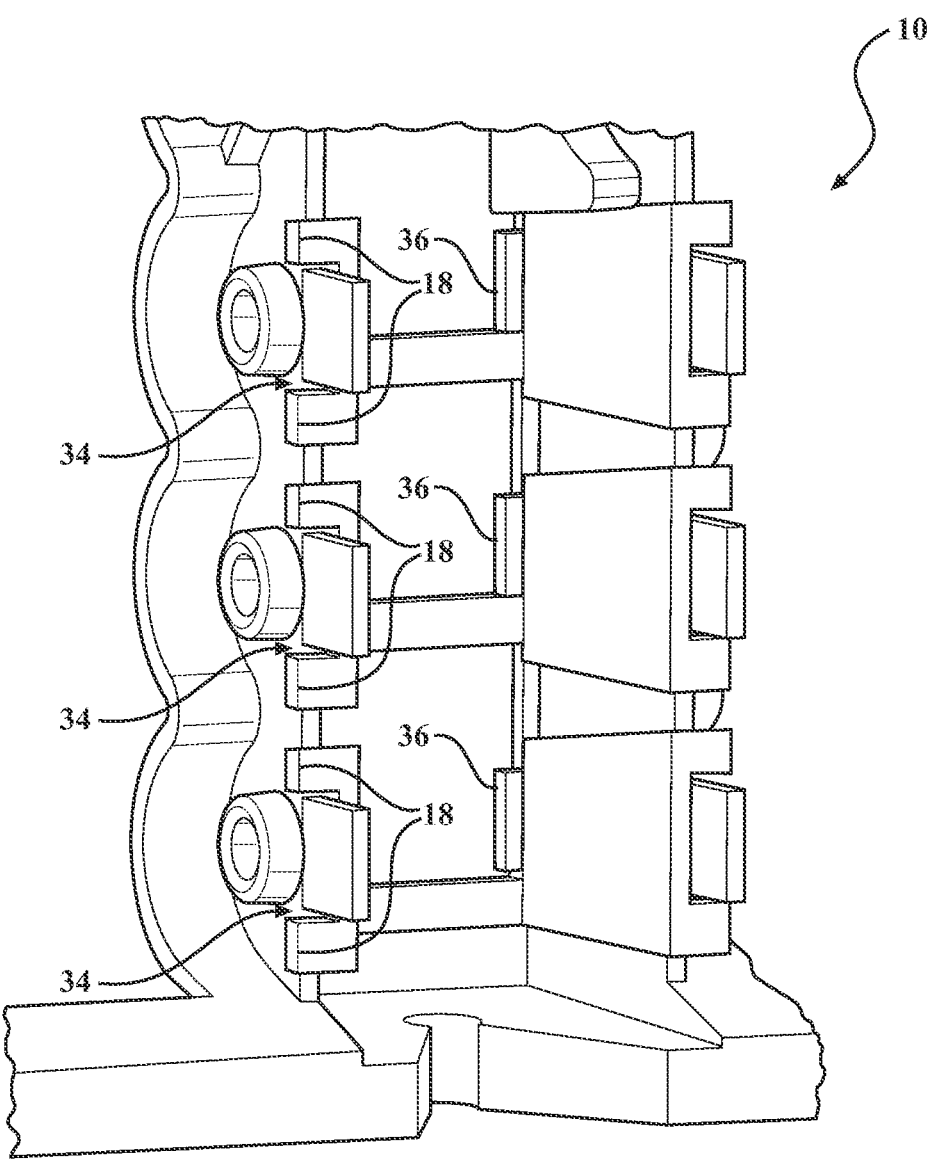
FIG. 10 is a perspective view of an AGS assembly, in accordance with aspects of the present invention.

Referring generally to FIGS. 2-10, and more particularly to FIGS. 8-10, there is at least one additional component 32 integrally formed with the at least one tab 18, in accordance with aspects of the present invention. During exemplary normal operation, the at least one vane 12 operably deflects the at least one tab 18 feature by pressing against the additional component 32, thereby keeping the tab(s) 18 away from interference with the link 14. During abnormal operation, a missing vane 12 allows tab(s) 18 to interfere with the link 14 motion, e.g., locks vane system at about 45° open position (or about farthest rearward position of link 14).

Referring more particularly to FIG. 10, there is depicted an exemplary added component 32 installed incorporating a plurality of frame cut-outs 34 for each tab 18. A plurality of location ribs 36 are adjacent each pivot hole.

Referring to the FIGS. 2-10 generally, while an active grill shutter system is shown and described, it is understood that the present invention is operably adaptable for incorporation with any alternative aerodynamic system or efficiency aid depending on the application without departure from the scope of the present invention. It is understood that the invention is operably adaptable with any active system, aero system, etc., depending on the application without departure from the scope of the present invention.

While exemplary spring-like features are described and depicted, it is understood that suitable features such as biasing members suitably operably adapted for the vanes and clearance/interference with any suitable vane linkage is contemplated depending on the application without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active grill shutter assembly incorporating integral diagnostics operably adapted for a vehicle, comprising:
    at least one frame incorporating a plurality of spring features, said spring features moveable between at least one first position and second position;
    a plurality of vanes operably rotatably coupled to said frame and pushing against said plurality of spring features to said first or second position to allow said plurality of vanes to rotate;
    at least one linkage operably coupled to said plurality of vanes, said at least one linkage contacting any of said plurality of spring features when a respective vane is missing, creating a jamming or locking condition against the at least one linkage to prevent any remaining vanes from rotating.

2. The active grill shutter assembly of claim 1, wherein said at least one linkage is a link bar operably coupled to each vane and said plurality of spring features are springboards, wherein a missing vane condition causes the respective springboard to be positioned to interfere with movement of the link bar.

3. The active grill shutter assembly of claim 1, wherein the jamming or locking condition keeps the remaining plurality of vanes at a partially-open position to allow for air flow for cooling purposes to prevent overheating of the vehicle's systems.

4. The active grill shutter assembly of claim 1, wherein said at least one spring feature is a springboard integrally formed with said frame and, when a vane is missing, said springboard automatically moves to the first or second position at about 45 degrees to interfere with movement of said linkage.

5. The active grill shutter assembly of claim 1, wherein said jamming or locking condition between said spring feature and linkage occurs when said at least one spring feature is at least about 15 to 85 degrees off from said frame.

6. The active grill shutter assembly of claim 1, further comprising an actuator, wherein the integral diagnostic assembly stops said actuator driving said vanes before said assembly's calibration range.

7. The active grill shutter assembly of claim 1, wherein under normal operation, the spring features are kept in position by the vanes, which push against bearing surfaces of the spring features to keep the spring features from the linkage.

8. The active grill shutter assembly of claim 1, wherein under normal operation the vane functions normally, rotating about 90° open and close.

9. The active grill shutter assembly of claim 1, wherein under normal operation, said vane and linkage rotate around a vane pivot, said linkage locates substantially against a surface of said frame, and a springboard is clear of interference to the linkage.

10. The active grill shutter assembly of claim 1, further comprising at least one actuator, wherein when any vane is missing, the resulting jamming condition between the spring feature and causes said actuator to operably sense an error present and operably alerts a control unit to an operational fault condition.

11. The active grill shutter assembly of claim 1, wherein said plurality of spring features comprises at least one additional component including a plurality of tabs, wherein each vane operably deflects said tab features, such that said tabs are kept away from interference with said linkage and said vanes can therefore rotate.

12. An active grill shutter system operably adapted for on-board diagnostics, comprising:
    a plurality of vanes selectively rotatable between opened/closed positions affecting predetermined airflow;
    at least one link operably coupled to said plurality of rotatable vanes;
    at least one biasing member adapted to operably function as a locking mechanism in the case where a vane is missing; and
    an actuator that operably senses the vane is missing.

13. The active grill shutter system of claim 12, wherein said biasing member is included within a frame as an integral component.

14. The active grill shutter system of claim 12, wherein, in normal operation, each vane pushes against each respective biasing member, which keeps these biasing member away from said link, and wherein if any of the vanes are missing, the biasing member will move laterally, creating an abutting interference with said link, which will not allow the vanes to rotate.

15. The active grill shutter system of claim 14, wherein the vanes not being able to rotate will operably cause said actuator to operably sense there is an error present and operably alert a control unit that there is a concern with the function of the active grill shutter system.

16. The active grill shutter system of claim 12, wherein the biasing member and link jam or lock the mechanism at a partially-open position, which will guarantee air flow for cooling purposes, to avoid overheating of the vehicle's systems.

17. The active grill shutter system of claim 12, wherein said biasing member is a separate component from a frame of said system.

18. The active grill shutter system of claim 12, wherein said at least biasing member is integrally formed with at least one tab, wherein said vanes operably cause said tabs to deflect such that said tabs are kept away from interference with said links coupled to said vanes thereby allowing said vanes to rotate.

19. An active grill shutter system operably adapted for a vehicle and incorporating diagnostics, comprising:
    a plurality of integral springs operable for predetermined diagnostic reading within said active grill shutter system, each integral spring including at least one opening;
    a frame, said frame incorporating said plurality of integral springs;

a plurality of vanes rotatably coupled to said openings and rotatable from at least an open position and a closed position, and at least one link operably coupled to said plurality of vanes, said plurality of vanes applying pressure against said plurality of integral springs keeps said integral springs out of the way of the vanes' motion and interference with said at least one link, and will cause the system to bind when any of the vanes are missing, which will not allow the vanes to rotate.

20. The active grill shutter system of claim 19, further comprising at least one actuator operably coupled to said link, wherein not allowing said vanes to rotate causes said actuator to operably sense there is an error present and operably alert a control unit that there is a concern with the function of said system.

* * * * *